United States Patent
Iijima et al.

(10) Patent No.: US 6,801,482 B1
(45) Date of Patent: Oct. 5, 2004

(54) INFORMATION RECORD/REPRODUCTION UNIT AND METHOD THEREOF

(75) Inventors: Takayuki Iijima, Saitama (JP); Junichi Yoshio, Saitama (JP); Katsuaki Yamanoi, Saitama (JP); Jun Shinohara, Saitama (JP); Osamu Yoshizawa, Saitama (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/325,417

(22) Filed: Jun. 4, 1999

(30) Foreign Application Priority Data

Jun. 5, 1998 (JP) .......................................... 10-158179

(51) Int. Cl.[7] ............................ G11B 19/02; G11B 7/00

(52) U.S. Cl. ................................ 369/44.11; 369/44.33; 369/47.14

(58) Field of Search ........................... 369/53.17, 53.16, 369/30.07, 30.24, 53.41, 53.42, 44.11, 30.16, 53.36, 53.13, 47.11, 47.14, 53.21, 30.19, 47.29, 47.55; 360/31, 134, 38.1

(56) References Cited

U.S. PATENT DOCUMENTS

| | | | | |
|---|---|---|---|---|
| 5,212,677 A | * | 5/1993 | Shimote et al. | 369/53.17 |
| 5,245,599 A | * | 9/1993 | Ishii et al. | 369/44.32 |
| 5,412,628 A | * | 5/1995 | Yamazaki et al. | 369/30.19 |
| 5,513,160 A | * | 4/1996 | Satoh et al. | 369/47.14 |
| 5,732,050 A | * | 3/1998 | Horie | 369/47.14 |
| 5,805,547 A | * | 9/1998 | Yamamuro | 369/53.21 |
| 6,058,085 A | * | 5/2000 | Obata | 369/53.17 |
| 6,442,117 B1 | * | 8/2002 | Saiki et al. | 369/47.3 |

* cited by examiner

Primary Examiner—William Korzuch
Assistant Examiner—Kim-Kwok Chu
(74) Attorney, Agent, or Firm—Sughrue Mion, PLLC

(57) ABSTRACT

An information reproduction unit has a data read means with a pickup for intermittently reading data recorded on a storage medium, a write means for writing the data in a memory, and a reproduction means for sequentially reading out the data written in the memory. The unit also has a defect detection means for detecting a defect of the storage medium during a data read waiting period. The defect detection means may determine the presence of a defect based on a readout result provided by the data read means. The unit may further include a storage means for storing a defect position information. Furthermore, a read characteristic may be adjusted on reading data at the defect position on the storage medium.

5 Claims, 10 Drawing Sheets

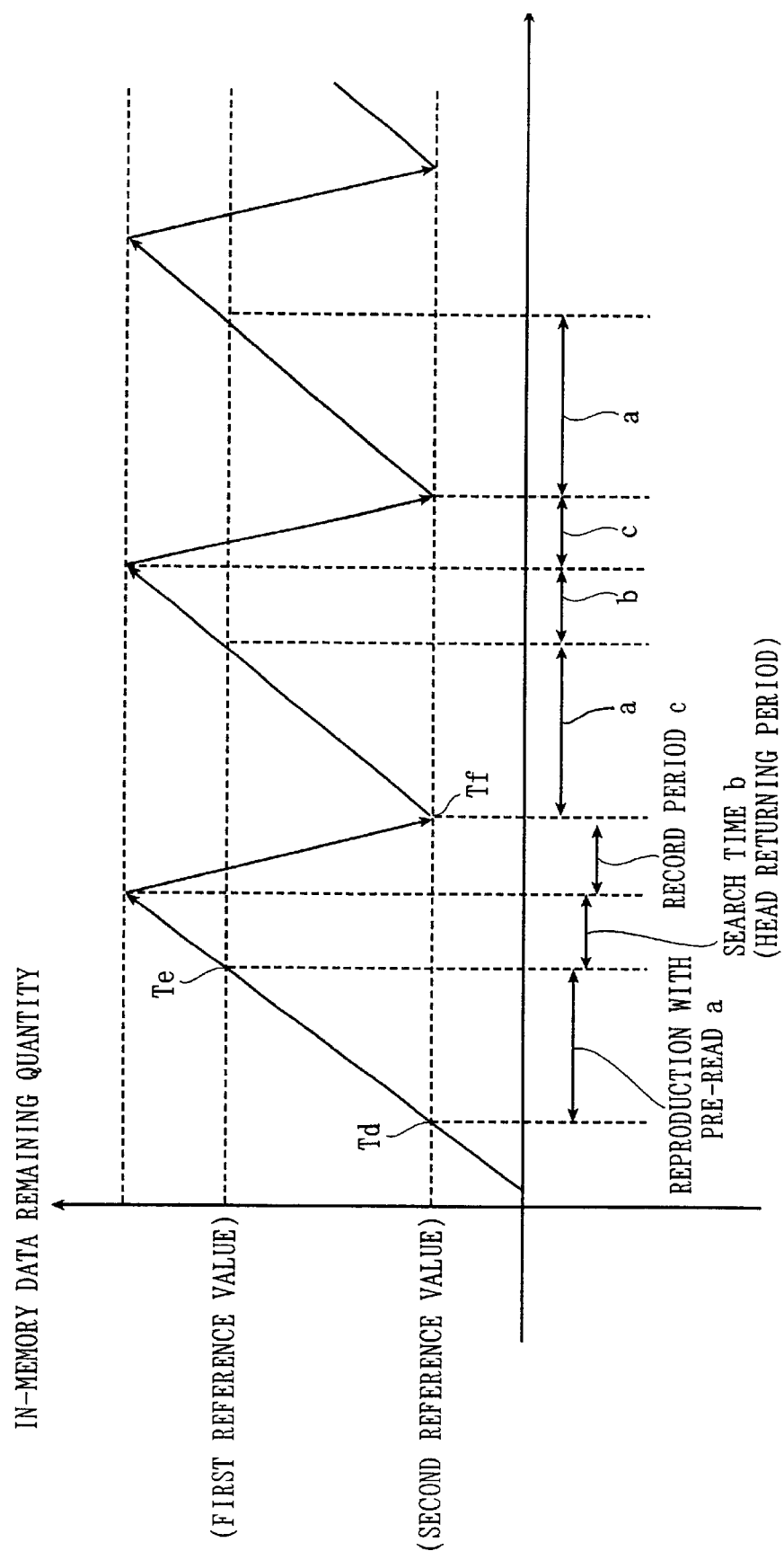

FIG. 10

| | 16bit | | 16bit | | |
|---|---|---|---|---|---|
| | MSB          LSB | MSB          LSB | MSB          LSB | MSB          LSB | |
| 1 HEADER | 0 0 0 0 0 0 0 0 | 1 1 1 1 1 1 1 1 | 1 1 1 1 1 1 1 1 | 1 1 1 1 1 1 1 1 | 0 |
| | 1 1 1 1 1 1 1 1 | 1 1 1 1 1 1 1 1 | 1 1 1 1 1 1 1 1 | 1 1 1 1 1 1 1 1 | 1 |
| | 1 1 1 1 1 1 1 1 | 1 1 1 1 1 1 1 1 | 1 1 1 1 1 1 1 1 | 0 0 0 0 0 0 0 0 | 2 |
| | CLUSTER | CLUSTER | 0 0 0 0 0 0 0 0 | 0 0 0 0 0 0 0 0 | 3 |
| | 0 0 0 0 0 0 0 0 | 0 0 0 0 0 0 0 0 | 0 0 0 0 0 0 0 0 | 0 0 0 0 0 0 0 0 | 4 |
| | 0 0 0 0 0 0 0 0 | 0 0 0 0 0 0 0 0 | 0 0 0 0 0 0 0 0 | 0 0 0 0 0 0 0 0 | 5 |
| | | | | | 6 |
| | | | FIRST TNO | LAST TNO | 7 |
| | | | | USED SECTORS | 8 |
| | | | | | 9 |
| | | | | DISC SERIAL NO. | 10 |
| 2 GENERAL DATA OF SEGMENTS | DISC | ID | P-DFA | P-EMPTY | 11 |
| | P-FRA | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | | | | | 76 |
| | | | | | 77 |
| 3 CONTROL TABLE (255 SEGMENTS) (01) | START ADDRESS | | | TRACK MODE | 78 |
| | END ADDRESS | | | LINK INFORMATION | 79 |
| (02) | START ADDRESS | | | TRACK MODE | 80 |
| | END ADDRESS | | | LINK INFORMATION | 81 |
| (03) | START ADDRESS | | | TRACK MODE | 82 |
| | END ADDRESS | | | LINK INFORMATION | 83 |
| (FC) | START ADDRESS | | | TRACK MODE | 500 |
| | END ADDRESS | | | LINK INFORMATION | 581 |
| (FD) | START ADDRESS | | | TRACK MODE | 582 |
| | END ADDRESS | | | LINK INFORMATION | 583 |
| (FE) | START ADDRESS | | | TRACK MODE | 584 |
| | END ADDRESS | | | LINK INFORMATION | 585 |
| (FF) | START ADDRESS | | | TRACK MODE | 586 |
| | END ADDRESS | | | LINK INFORMATION | 587 |

INFORMATION RECORD/REPRODUCTION UNIT AND METHOD THEREOF

BACKGROUND OF THE INVENTION

1. Field of the Invention

The present invention relates to recording or reproduction of audio signals or the like which are read out by various types of reproduction units with fidelity to the original signals.

2. Prior Art

Recently, general music or image players having a storage medium such as a disc for readout or record thereof have been produced to be widely used. Particularly, a record and reproduction system incorporating a mini-disc (called MD hereinafter) that is a magneto-optic disc is becoming popular among users. The MD is capable of record and reproduction of music data with ease in the same way as conventional audio cassettes or the like.

To simplify the following description, a record and reproduction disc unit will be discussed as an example of an audio record MD. However, the present invention including its embodiments described later is naturally applicable to various types of discs capable of record and reproduction of image, data, or the like.

The MD is received in a cartridge in a manner similar to a 3.5 inch floppy disc mounted in a personal computer. The MD is capable of a maximum 74 minute record and reproduction like a CD (compact disc). The MD adopts a 44.1 kHz sampling frequency with 16 bit quantized signals like a CD, but utilizes a data compression art called as ATRAC (Adaptive Transform Acoustic Coding) to compress recorded data to one-fifth.

ATRAC quantizes signals by an A-D conversion like a CD, and the quantized signals are divided every predetermined time (the maximum is 11.6 ms) so as to be processed by Fourier transform processing to obtain about a thousand of frequency components (spectrum). The spectrum is separated into some zones based on a human auditory sense characteristic such as minimum audible limits (each minimum audible level corresponding to each frequency) and a masking effect (a quiet sound is not audible in a loud one). The zones are efficiently marked with codes in consideration of priority thereof.

As discussed above, the record data quantity is reduced to one-fifth based on the human auditory sense characteristic so that MD is not so much inferior to CD in audibility. Such MD having a small disc diameter is presently utilized mainly in portable units as a headphone stereo. The portable units are subject to an impulsive force due to vibration, falling, etc. because of usage during the transportation thereof. Particularly, MD discs that are storage mediums have a data record surface sensitive to a scratch caused by various reasons although they each are received in a cartridge like a 3.5 inch floppy disc.

If there is produced a deficiency (defect) such as a surface flaw on a storage medium like a disc, a sound skip and a deterioration of reproduction characteristics arise on reproduction of the storage medium. On recording, the deficiency also arises a record quality degradation due to or an error like a dropout of recorded data or a defective condition such as a repeated record operation at an area of the medium.

As described above, the conventional information record/reproduction unit has such disadvantages if there is produced a deficiency like a surface flaw on the disc.

SUMMARY OF THE INVENTION

In view of the disadvantages in the prior art, an object of the present invention is to provide an information record/reproduction unit and a method of the same, which are capable of record and reproduction of the information with a maximum fidelity to the original signals even if there is produced a defect due to a surface flaw and etc. on a storage medium such as a disc.

For achieving the object, a first aspect of the present invention is an information reproduction unit which includes:

a read means having a pickup for reading data recorded on a storage medium, a write means for writing the data into a memory, a reproduction means for sequentially reading out the data written in the memory, and a detection means for detecting a defect of the storage medium storing the data before the data is read out from the storage medium.

A second aspect of the present invention is an information reproduction unit having a pickup for intermittently reading data recorded on a storage medium, a write means for writing the data in a memory, and are production means for sequentially reading out the data written in the memory. The information reproduction unit includes:

a data read means for intermittently reading the data recorded on the storage medium, and a first defect detection means for detecting a defect of the storage medium, which stores data to be subsequently reproduced, during a read pause period of the data read means.

A third aspect of the present invention is dependent on the second aspect of the invention. Furthermore, the first defect detection means detects a defect based on a readout result of data to be reproduced next.

A fourth aspect of the present invention is dependent on the second aspect of the invention. The unit further includes:

a first storage means for storing a defect position information of the defect detected on the storage medium by the first defect detection means, a read characteristic adjustment means for adjusting a read characteristic on reading data at the defect position, which is stored by the first storage means, on the storage medium.

A fifth aspect of the present invention is dependent on the fourth aspect of the invention. Furthermore, the read characteristic adjustment means reduces at least one of servo loop gains of a focusing servo and a tracking servo.

A sixth aspect of the present invention is dependent on the second aspect of the invention. Furthermore, the first defect detection means detects a defect of the storage medium by detecting that at least one of a RF signal, a tracking error signal, and a focusing error signal reaches a predetermined threshold level.

A seventh aspect of the present invention is an information record unit which includes:

a write means for writing data, which will be recorded on a storage medium, firstly in a memory, a record means for recording the data, which is written in the memory, on the storage medium, and a detection means for detecting a defect of the storage medium recording the data before the data is recorded on the storage medium.

An eighth aspect of the present invention is an information record unit for writing data firstly in a memory to intermittently record the data, which is written in the memory, on a storage medium. The unit includes:

a data record means for intermittently recording data, which is to be written on the storage medium, on the storage medium, and a second defect detection means for detecting a defect of the storage medium to record next data during a record pause period of the data record means.

A ninth aspect of the present invention is dependent on the eighth aspect of the invention. Furthermore, the second defect detection means detects a defect based on a readout result of an area which has recorded data to be stored next by means of a data read means.

A tenth aspect of the present invention is dependent on the eighth aspect of the invention. The unit further includes a third defect detection means for detecting the extent of the defect detected by the second defect detection means.

An eleventh aspect of the present invention is dependent on the eighth aspect of the invention. The unit further includes:

a second storage means for storing a defect position, which is detected by the second defect detection means, on the storage medium, and a record characteristic adjustment means for adjusting a record characteristic on recording data of the defect position, which is stored by the second storage mean, on the storage medium.

A twelfth aspect of the present invention is dependent on the eleventh aspect of the invention. Furthermore, the record characteristic adjustment means reduces at least one of servo loop gains of a focusing servo and a tracking servo.

A thirteenth aspect of the present invention is dependent on the tenth aspect of the invention. The unit further includes a third storage means for storing a defect position on the storage medium detected by the third defect detection means, wherein the data record means records the data on the storage medium with avoiding the defect position.

A fourteenth aspect of the present invention is dependent on the seventh aspect of the invention. Furthermore, the defect detection means detects a defect of the storage medium by detecting that at least one of a RF signal, a tracking error signal, and a focusing error signal reaches a predetermined threshold level.

A fifteenth aspect of the present invention is dependent on the seventh aspect of the invention. The unit further includes a decision means for determining whether the storage medium is a virgin record disc or not, wherein the second defect detection means detecting a defect of the storage medium based on a reflection light quantity from the storage medium where the decision means has determined that the storage medium is a virgin record disc.

A sixteenth aspect of the present invention is an information reproduction method for reading data recorded on a storage medium by means of a pickup, writing the data in a memory, and sequentially reading out the data written in the memory. The information reproduction method includes the steps of:

reading a data recorded on the storage medium from a predetermined top address of the storage medium by a read means, before next data is read out from the storage medium, storing the read data in the memory, detecting a defect of the storage medium based on the data stored in the memory, storing the address of the defect position on the storage medium, returning the read means to the predetermined top address on the storage medium, and reducing at least one of servo loop gains of a focusing servo and a tracking servo to read the data from the predetermined top address on the storage medium by the read means when a defect is detected on the storage medium.

A seventeenth aspect of the present invention is an information reproduction method for intermittently reading data recorded on a storage medium by means of a pickup, writing the data in a memory, and sequentially reading out the data written in the memory. The information reproduction method includes the steps of:

reading a data recorded on the storage medium from a predetermined top address of the storage medium by a read means during a pause period of the data reading for the reproduction, before a next data is read out from the storage medium, storing the read data in the memory, detecting a defect of the storage medium based on the data stored in the memory, storing the address of the defect position on the storage medium, returning the read means to the predetermined top address on the storage medium during a pause period of the data readout, and reducing at least one of servo loop gains of a focusing servo and a tracking servo to read the data from the predetermined top address on the storage medium by the read means when a defect is detected on the storage medium.

An eighteenth aspect of the present invention is an information record method for writing data, which will be recorded on a storage medium, in a memory firstly, and for recording the data, which is written in the memory, on the storage medium, the information reproduction method comprising the steps of:

reproducing of the storage medium from a predetermined top address of the storage medium by a predetermined read means before recording data on the storage medium, storing the reproduced information in the memory, detecting a defect of the storage medium based on the information stored in the memory, storing the address of the defect position on the storage medium, returning the read means to the predetermined top address on the storage medium, and adjusting a data record characteristic on recording data of the address of the defect position on the storage medium to record the data from the predetermined top address on the storage medium by the read means when a defect is detected on the storage medium.

A nineteenth aspect of the present invention is an information record method for writing data, which will be recorded on a storage medium, in a memory firstly, and for intermittently recording the data, which is written in the memory, on the storage medium, by a predetermined data record means, the information record method comprising the steps of:

reproducing of the storage medium from a predetermined top address of the storage medium by a predetermined read means during a pause period of the data recording, before recording data on the storage medium, storing the reproduced information in the memory, detecting a defect of the storage medium based on the information stored in the memory, storing the address of the defect position on the storage medium, returning the record means to the predetermined top address on the storage medium during a pause period of the data recording, and adjusting a data record characteristic on recording data of the address of the defect position on the storage medium to record the data from the predetermined top address on the storage medium by the read means when a defect is detected on the storage medium.

Now, operational effects of the present invention will be discussed. As described above, in the present invention, a defect on the storage medium such as a disc due to a surface flaw thereof is detected before data read/record, and a read characteristic or a record characteristic is adjusted at the defect position. Thereby, during the reproduction, it is avoided that a reproduction signal contains a data deterioration like a sound skip. Furthermore, it is also avoided that the recording quality is degraded due to a dropout or a garbage of record data (signal) during recording, and a drawback such a repeated record operation of the same area will be avoided.

BRIEF DESCRIPTION OF THE DRAWINGS

FIG. 9 is a graphic illustration showing an example of timing of data reading onto the disc 28 and the memory 23 during reproduction of an information record/reproduction unit; and FIG. 10 is a diagram showing an example of a data arrangement of a U-TOC area of a mini-disc.

DETAILED DESCRIPTION OF THE PREFERRED EMBODIMENTS

Referring to the accompanied drawings, embodiments of an information record/reproduction unit according to the present invention will be discussed hereinafter.

Figure 1:
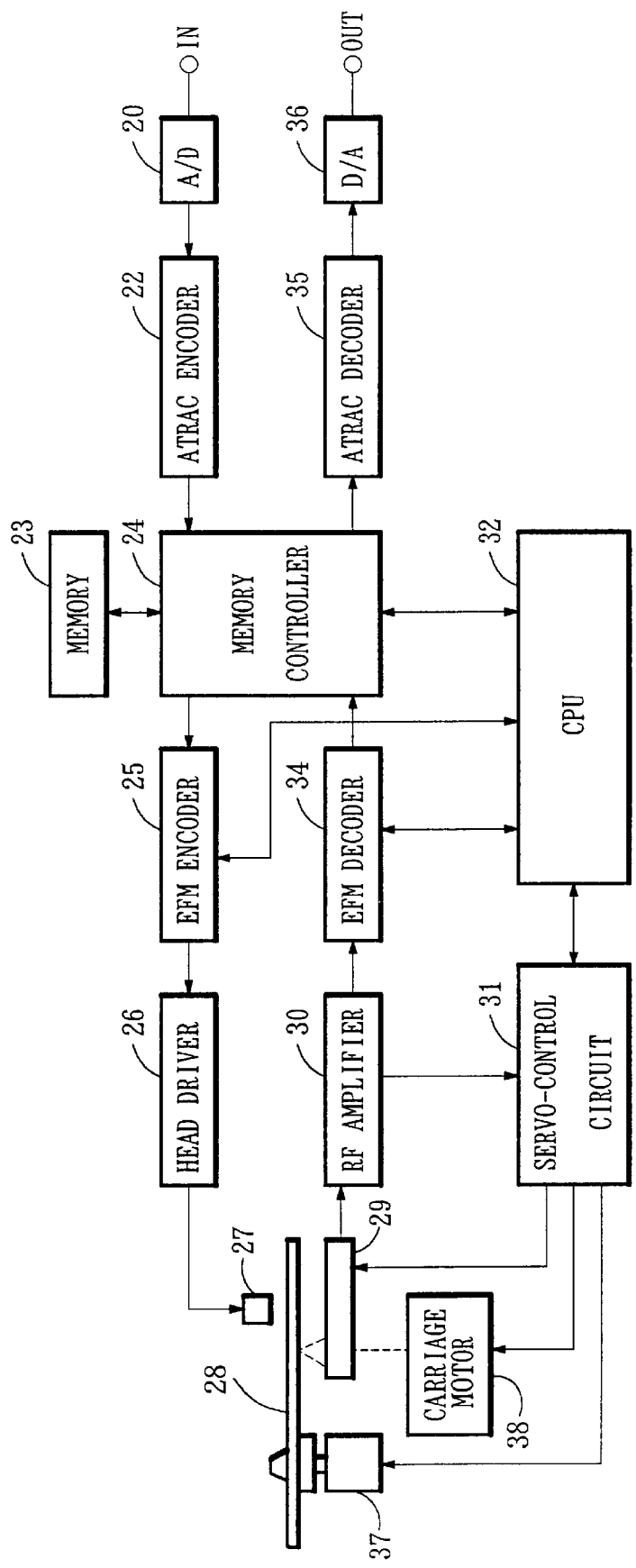
FIG. 1 is a block diagram showing a configuration of an information record/reproduction unit according to the present invention.

FIG. 1 is a block diagram showing a configuration of an information record/reproduction unit according to the present invention.

In FIG. 1, an ATRAC encoder 22 receives digital audio signals through an A-D converter 20 from an audio signal supply means (not shown) such as a CD player and a radio. The ATRAC encoder 22 compresses every block of digital audio signals supplied in time sequence by an audio compression art called ATRAC.

The ATRAC encoder 22 is connected to a memory controller 24 which controls writing and readout of a RAM memory 23 that is a shock proof memory. The compressed digital audio signals are written in the memory 23 once to be read out in the written sequence.

By an encoder 25, the digital audio signals read out from the memory 23 are modulated in an EFM (eight-to-fourteen modulation) process and are corrected in an error correction process such as CIRC (Cross Interleave Reed-Solomon code). Then, the modulated signals are supplied to a head driver circuit 26. The head driver circuit 26 drives a record head 27, which is a data record means, according to the signals supplied from the EFM encoder 25. The record head 27 applies a magnet field on a storage medium that is a MD (also called a mini-disc hereinafter) 28.

On recording, an optical pickup 29 radiates a laser beam on a surface of the mini-disc 28, on the other side of which a magnetic field is applied. In a portion heated up to a high temperature by the laser beam (actually, on a predetermined continuous track), the signals(magnetic fields) supplied from the head 27 are recorded.

On reading, the optical pickup 29, which is a data read means, radiates a laser beam to read the recorded signals. The optical pickup 29 has a light receiving element to receive a reflection light from the mini-disc 28. The optical pickup 29 outputs signals each corresponding to a received light quantity to a RF amplifier 30.

The RF amplifier 30 is connected to a servo-control circuit 31. The servo-control circuit 31 operates according to a command from a CPU 32. The servo-control circuit 31 includes a spindle servo for rotating the disc in synchronization with reference signals according to servo signals supplied from the amplifier 30 that receives signals from the optical pickup, a tracking (TRKG) servo for modifying an angle of a mirror according to the off-centering of the disc so that the laser beam always follows one signal track, a focusing (FOCUS) servo for correctly positioning an objective lens to follow the vertical disc swing during rotation of the disc to focus the beam in a pit of the disc, and a carriage servo for moving the optical pickup 29 in a radial direction of the disc.

The mini-disc 28 is rotated by a spindle motor 37 included in the spindle servo system, and the optical pickup 29 is moved by a carriage motor 38 included in the carriage servo system.

On reproduction, the optical signals are received by the optical pickup 29, which are read-out signals supplied to an EFM decoder 34 by way of the RF amplifier 30. The EFM decoder 34 corrects errors in the read-out signals according to a CIRC process and demodulates the read-out signals in an EFM modulation. Then, the demodulated signals are supplied to a memory controller 24.

The memory controller 24 controls writing of the read-out data into the memory 23 during data reproduction. In addition, the controller 24 reads data stored in the memory 23 at a speed lower than the writing. The stored data is deleted from the memory 23 and is supplied to an ATRAC (Adaptive Transform Acoustic Cording) decoder 35.

The ATRAC decoder 35 demodulates digital audio signals compressed by an ATRAC audio compression process. The digital audio signals processed by the ATRAC decoder 35 are supplied to a D-A converter 36 to be converted into analog audio output signals. In addition, the memory controller 24, the EFM encoder 25, and the EFM decoder 34 each are controlled by the CPU 32. The CPU 32 also provides such a control process as a prefetch scan in information reproduction and record operations of an information record/reproduction unit according to the present invention.

On reading of the information record/reproduction unit, if there is a surface flaw in the disc (MD) 28, or if an external vibration force causes a jump in tracking on the disc, RF signals supplied from the RF amplifier 30 increase suddenly in amplitude as illustrated in FIG. 2(a). This sudden amplitude increase of read-out RF signals cases a sound skip in a readout audio side.

Due to the sudden amplitude variation, focusing error signals FE and tracking error signals TE also vary significantly as illustrated in FIGS. 2(b), (c). By detecting the variations of the read-out RF signals, the focusing error signals FE, and the tracking error signals TE, as illustrated in FIG. 2D, there is provided a defect signal DF showing that a defect of the disc like a surface flaw has been detected. More specifically, a threshold level is predetermined for each of these kinds of signals, and when the level of each signal reaches or exceeds the associated threshold level, it is determined that a defect in the disc has been detected. In addition, the threshold levels are better predetermined so as to be associated with a jump in tracking of the disc.

The above-mentioned configuration is corresponding to the first and second defect detection means, which are described in the summary of the invention, of the present invention.

Referring further to the defect detection of the disc, where the EFM decoder 34 can not correct an error of read-out signals by the CIRC method, it is determined that there is a defect in an area including the read-out signals.

In addition, an unused disc (initial condition disc having no data) has no RF signal so that defect detection of such discs is performed based on a threshold of a light (ray) quantity signal DE (reflection light quantity) as illustrated in FIG. 2(e). That is, on mounting of a disc, where the disc is determined to be an unused disc, the reflection light quantity detection can determine the presence of a defect of the disc, since the defect causes a significant level down of the associated signal.

Figure 2:
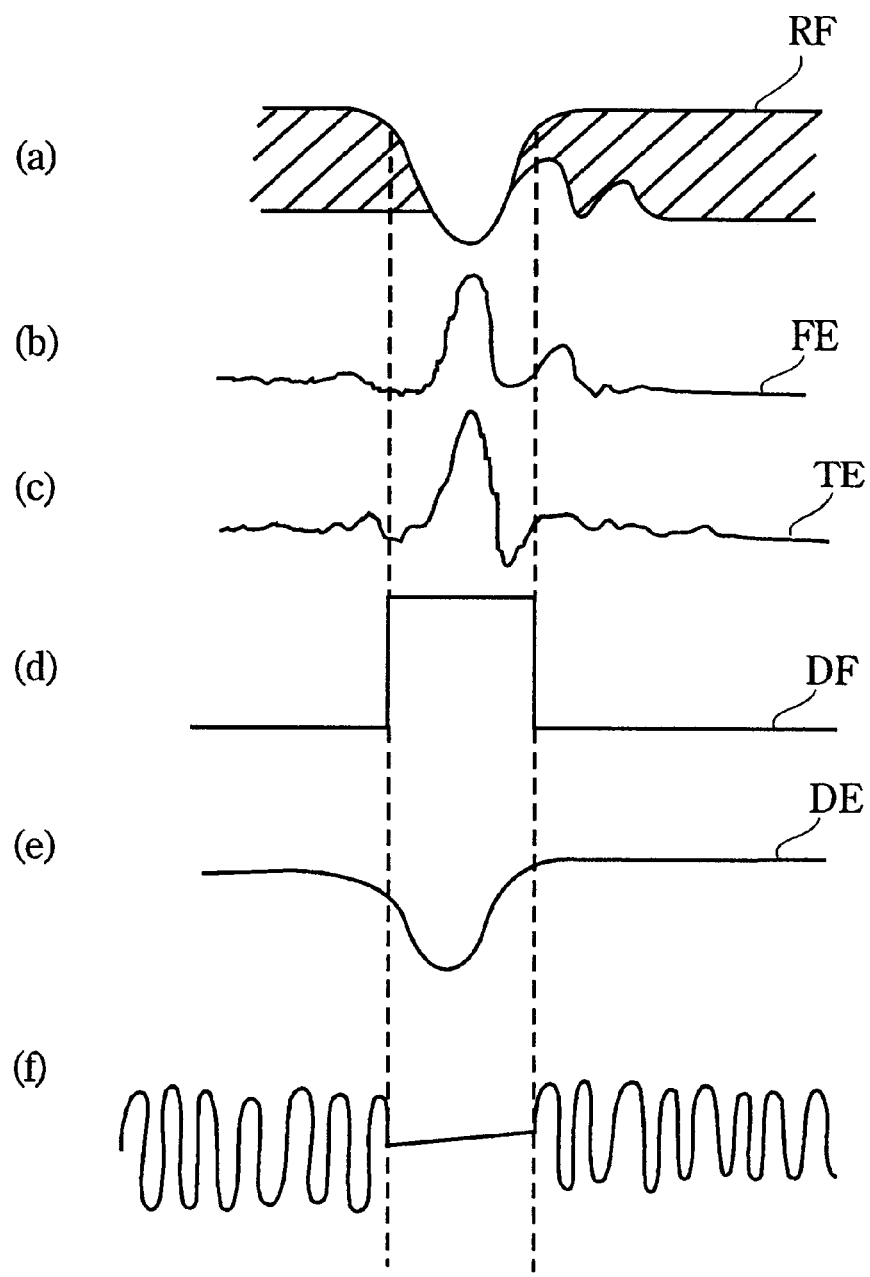
FIG. 2 shows graphs for discussing a defect detection method according to the present invention.

Meanwhile, a MD has ADIP signals as shown in FIG. 2(f). These ADIP signals (pulses) may be counted in number to determine the presence of a defect in the MD. When there is a dropout of the ADIP signals more than a predetermined value or a predetermined time, it is determined that there is a defect in the MD. As described above, FIG. 2 is an illustration for discussing a defect detection method of the MD in detail.

Figure 3:
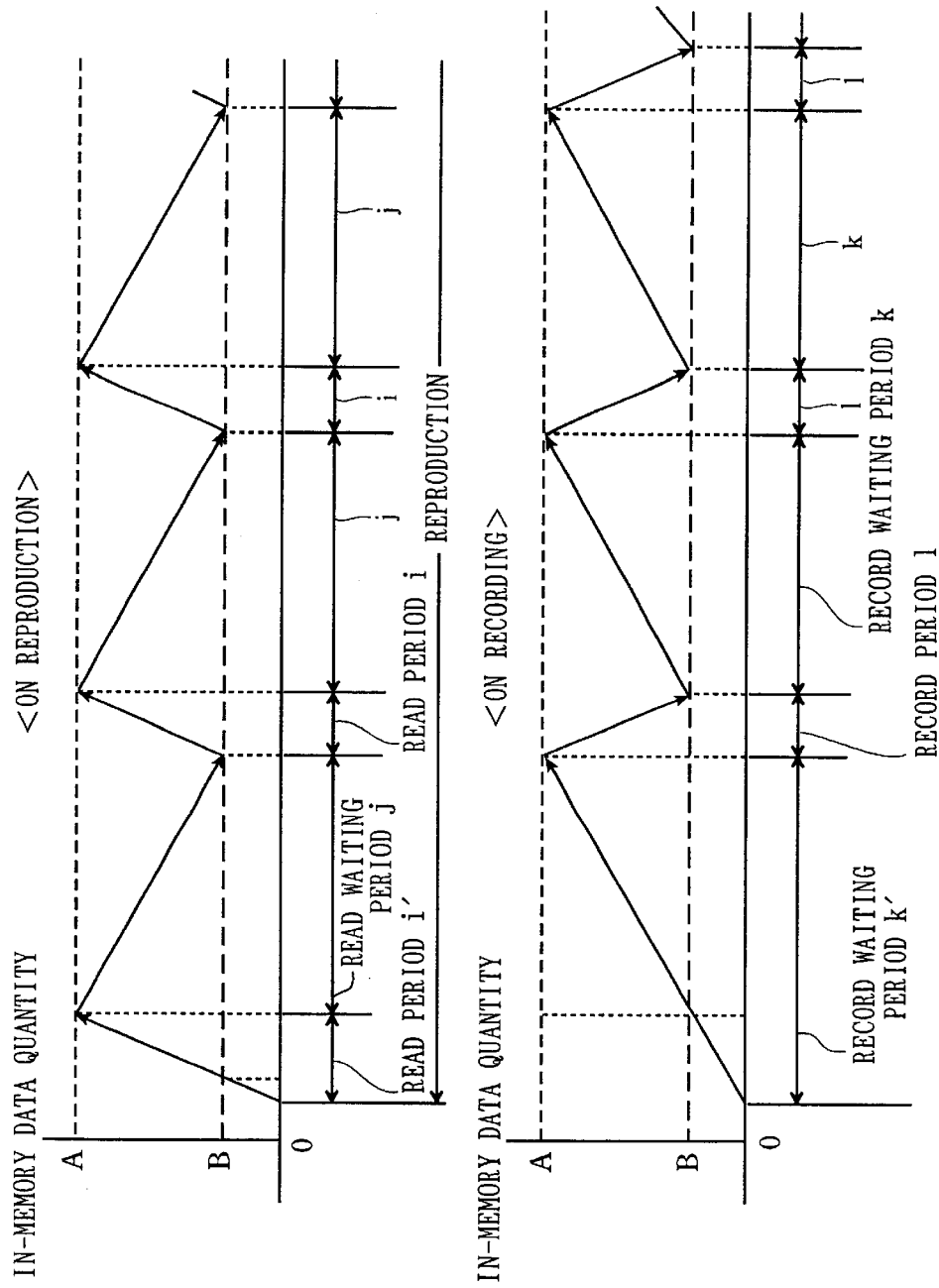
FIG. 3 is a graphic illustration showing an example of timing of data reading/writing of a memory and a disc (MD) during record/reproduction of a mini-disc player.

FIG. 3 is a graph showing an example of timing of data reading/writing of the disc (MD) 28 and the memory 23 during reading/recording of a mini-disc player.

As shown in FIG. 3, on reading, the mini-disc player continuously reads data from the disc 28 until the stored data quantity in the memory 23 rises up to a predetermined value A (corresponding to a period i for reading the disc 28). When the stored data quantity exceeds the predetermined value A, data reading from the disc 28 is interrupted (corresponding to awaiting period j of reading from the disc 28). In addition, during the reading period, the memory 23 is sequentially outputting the data and is continuously supplying read-out signals (audio signals) through a D-A converter 36 to a headphone (not shown) or the like.

Even during the read waiting period, the data output is continuous so that the remaining data in the memory 23 decreases gradually. When the remaining data in the memory 23 becomes less than a predetermined value B, data reading from the disc 28 starts again (corresponding to the reading period i). That is, during readout of the data, the data is intermittently read (corresponding to the reading period i and the read waiting period j) from the disc 28 and are intermittently written into the memory 23. The written data is sequentially read out.

Next, during recording (except an initial record period), the memory 23 sequentially receives signals (audio signals) supplied from an A-D converter 20. Until the remaining data quantity in the memory 23 reaches the predetermined value A, the data recording onto the disc 28 is interrupted (record waiting period k of the disc 28). When the remaining data quantity in the memory 23 exceeds the predetermined value A, recording of the date onto the disc 28 starts (recording period 1 of the disc 28).

Thereafter, when the remaining data quantity of the memory 23 becomes less than a predetermined value B, recording onto the disc is interrupted (record waiting period k of the disc 28). Thus, during recording, the data are intermittently recorded onto the disc (during recording period l of the disc 28 and a record waiting period k of the disc 28).

That is, the mini-disc player reads the data from the disc 28 into the memory 23 for a short period (reading period i) and intermits the data reading from the disc 28 into the memory 23 for a period (read waiting period j) which is about four times longer than the reading period i. On recording, the mini-disc player records the data from the memory 23 onto the disc 28 for a short period (recording period l) and intermits the data recording onto the disc 28 for a longer period (record waiting period k) which is about four times longer than the reading period i.

An information record/reproduction process (prefetch scan) of a reproduction unit according to the present invention is performed during a readout intermittent period of the mini-disc a player (readout waiting period j of the disc 28) and during a recording intermittent period (record waiting period k of the disc 28).

Next, an operation (prefetch scan) of an information record/reproduction unit according to the present invention will be discussed.

Figure 4:
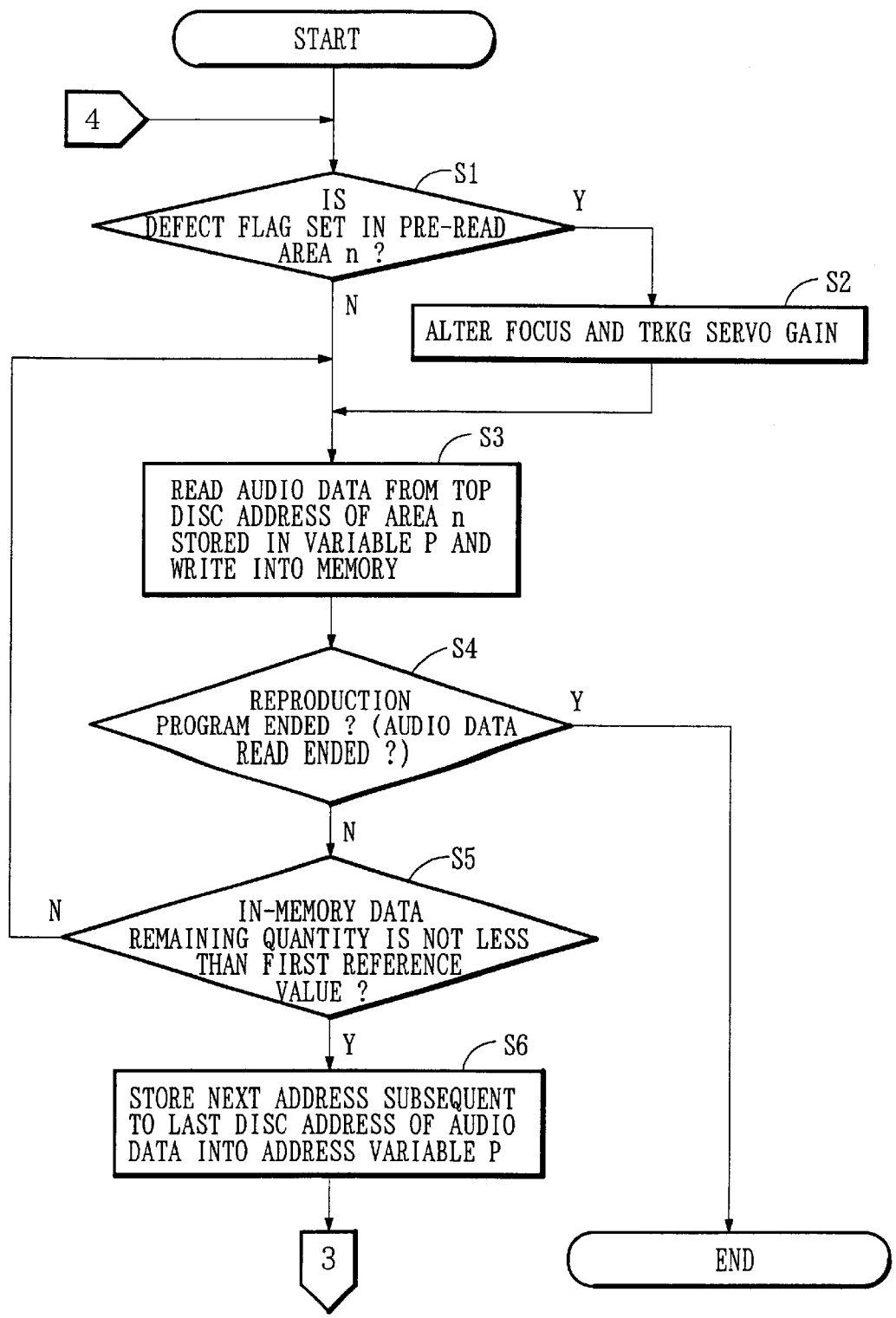
FIGS. 4 and 5 are flowcharts showing an information reproduction operation (prefetch scan) of an information record/reproduction unit according to the present invention.
Figure 5:
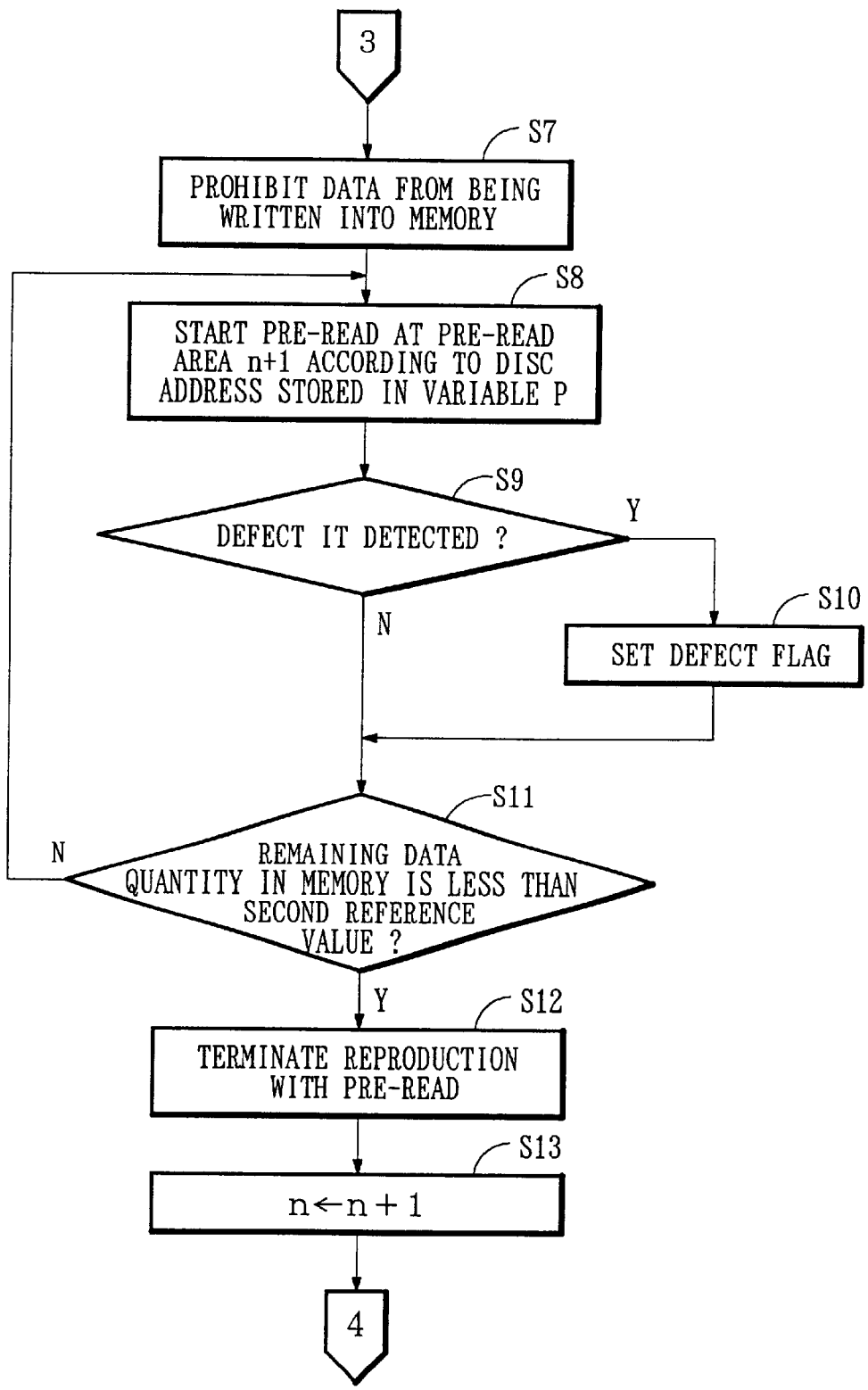
Figure 6:
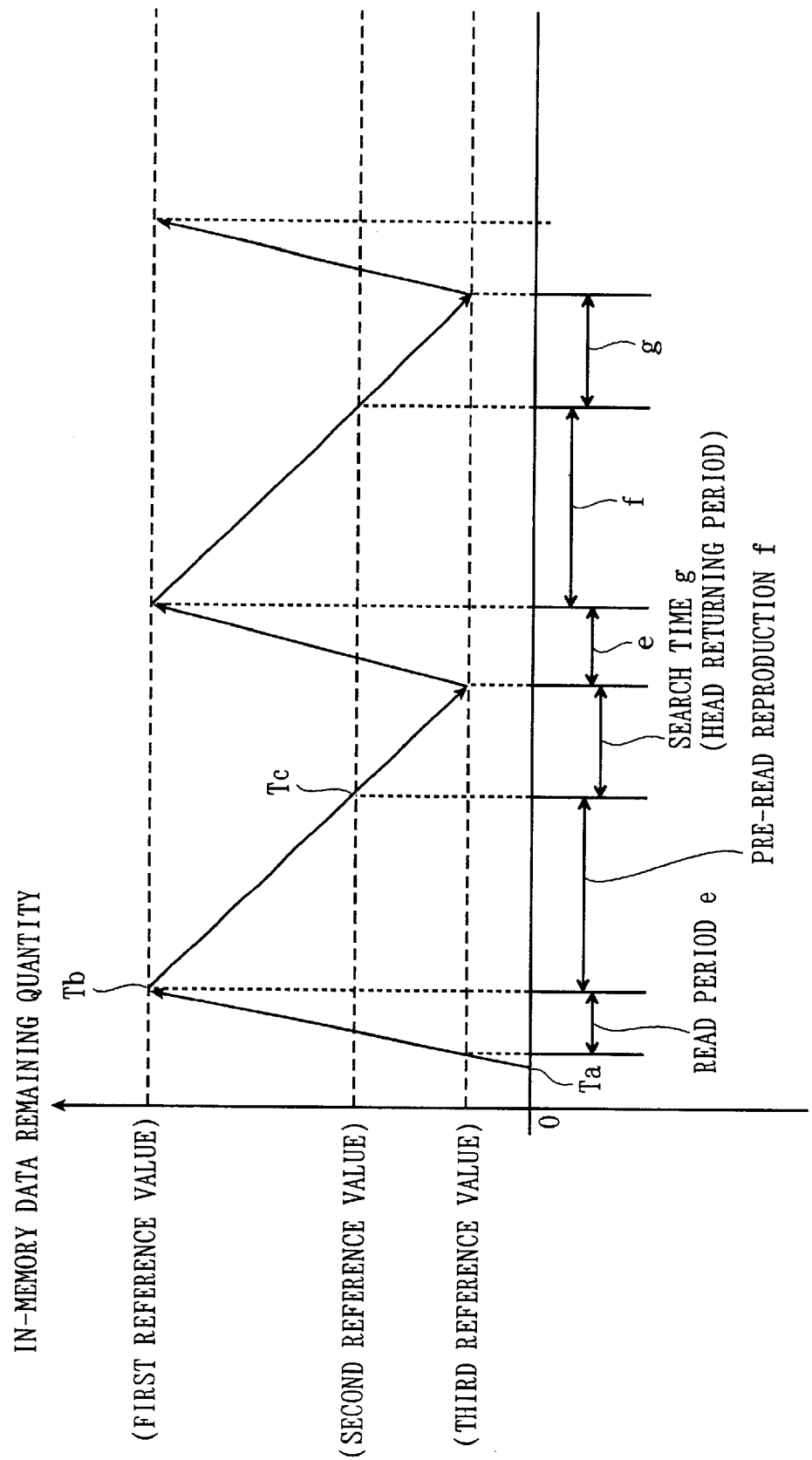
FIG. 6 is a graphic illustration showing an example of timing of data recording onto a disc and into a memory during reproduction of an information record/reproduction unit.

FIGS. 4 and 5 are flowcharts showing an information reproduction operation (prefetch scan) of a reproduction unit according to the present invention. FIG. 6 is a graph showing an example of timing of data reading of the disc 28 and the memory 23 during reading of an information record/reproduction unit.

Normal Reproduction Process

The information record/reproduction unit according to the present invention has a disc mounting portion which receives a disc (MD). After mounting the disc, a reproduction operation starts, and at first, CPU 32 confirms the presence or not of a defect flag (discussed later). That is, a defect flag stored in the CPU memory is read out to be confirmed (step S1). The defect flag is stored in a predetermined area having a pre-read area number n (natural number), which is read out based on a read command.

In step S1, when a defect flag has been set, it is determined that there is a defect like a surface flaw in the disc. Then, a servo loop gain such as a focusing (FOCUS) servo and a tracking (TRKG) servo is adjusted (reduced) at an address position where a defect is recognized. To adjust the gain, for example, an equalizer characteristic of the focusing servo and the tracking servo may be adjusted (reduced).

Then, with the adjusted servo loop gain, data is read from a top address of an area n of the disc to write it in the memory 23 (step S3). The top address is stored in a variable P. When the defect flag has not been set in step S1, the servo gain is not adjusted, and data is read from a top address of an area n of the disc to write it in the memory 23 (step S3).

In a next step S4, it is determined whether the execution of a reproduction program is ended. When the decision results in "YES", the reproduction process is terminated. When the decision results in "NO", a next step S5 determines whether the remaining data quantity in the memory 23 is not less than a first reference value shown in FIG. 6. When it is less than the first reference value, the execution returns to step S3 to read data stored in a next address. In step S5, when the remaining data quantity is not less than the first reference value (timing Tb shown in FIG. 6), a next step S6 stores a next address subsequent to the latest recorded disc address of audio data into an address variable P.

Next, a step S7 prohibits the data from being written into the memory 23. Subsequently, the execution enters a read waiting period i, in which a prefetch scan is one of characteristics of the present invention.

Pre-read Process

At first, step S8 starts pre-read of a pre-read area n+1 having a predetermined area according to a disc address stored in the variable P (see period f of FIG. 6). During the pre-read, when a defect is recognized, a defect flag is set in a memory, which is a first record means, of CPU 32 (steps S9 and S10). During the pre-read process for detecting a defect, reproduced data is not written into the memory 23.

Next, step S11 determines whether the remaining data quantity in the memory 23 is not less than a second reference value shown in FIG. 6. When it is not less than the second reference value, the execution returns to step S8 and reproduction with pre-read is performed at a next disc address. When it is less than the second reference value (timing Tc shown in FIG. 6), step S12 terminates the reproduction with pre-read and changes the area number from n+1 to n (step S13), and the execution returns to step S1.

Additionally, in FIG. 6, during the pre-read period f, the remaining data quantity in the memory 23 varies from the first reference value to the second reference value. That is because a disc data reading head (optical pickup 29 or the like) requires a predetermined time (search time g) to return from a pre-read end address to a data reading start address (prefetch scan start address or the like). In FIG. 6, the search time g is a period within which the remaining data quantity in the memory 23 decreases from the second reference value to a third reference value. Normally, the search time is determined to be a little longer than the reading head (optical pickup 29) returning time.

In this embodiment, the pre-read end timing is when the remaining data quantity in the memory 23 has decreased to the second reference value, That is, the pre-read period f is associated with the disc remaining data quantity. Alternatively, readout from the MD disc is executed by a given length including some sectors (readout is interrupted after reading of a unit). The pre-read end timing may be when, for example, two times of the sector unit have been pre-read. As mentioned above, the pre-read end timing may be determined based on various methods in consideration of such a search time as the time g, in any of which the search time is necessary.

Furthermore, in this embodiment, a servo loop gain of a focusing servo or a tracking servo is adjusted (or decreased) when a defect in the disc is recognized so as to avid the defect. Alternatively, the defect may be avoided by adjusting a PLL (phase lock loop) set value.

Moreover, when a defect in the disc is recognized, a defect flag may be set so that the defect position address is stored in CPU 32 to avoid the stored address on reading the disc data. In this embodiment, prefetch scan of the disc is carried out after once reading thereof. Alternatively, prefetch scan of the disc (also at a restart of the disc reproduction) may be carried out before normal reproduction thereof. In addition, normal reproduction of the disc may be carried out after detecting the presence of a defect all over the disc.

Figure 7:
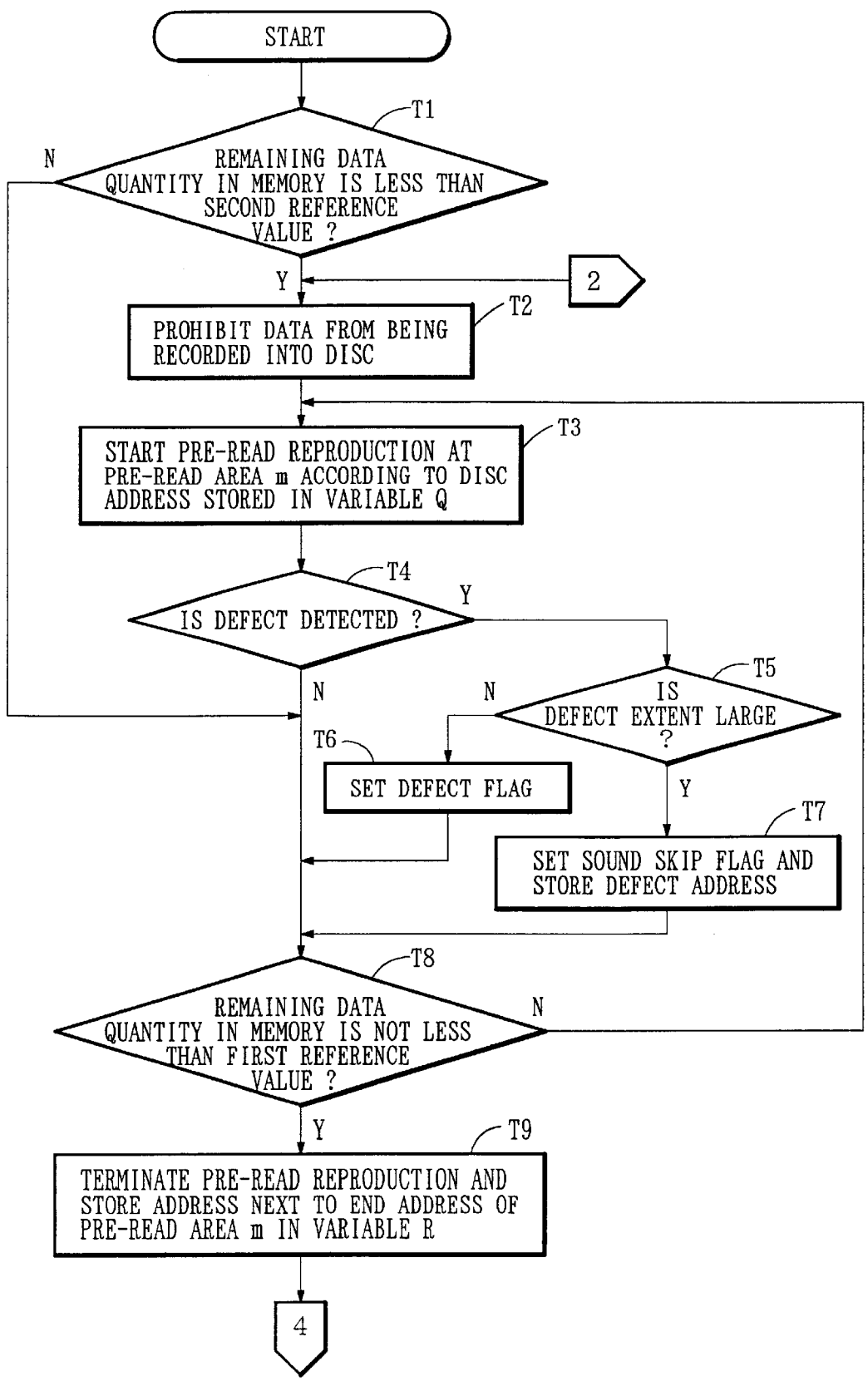
FIGS. 7 and 8 are flowcharts showing an information recording operation (prefetch scan) of an information record/reproduction unit according to the present invention.
Figure 8:
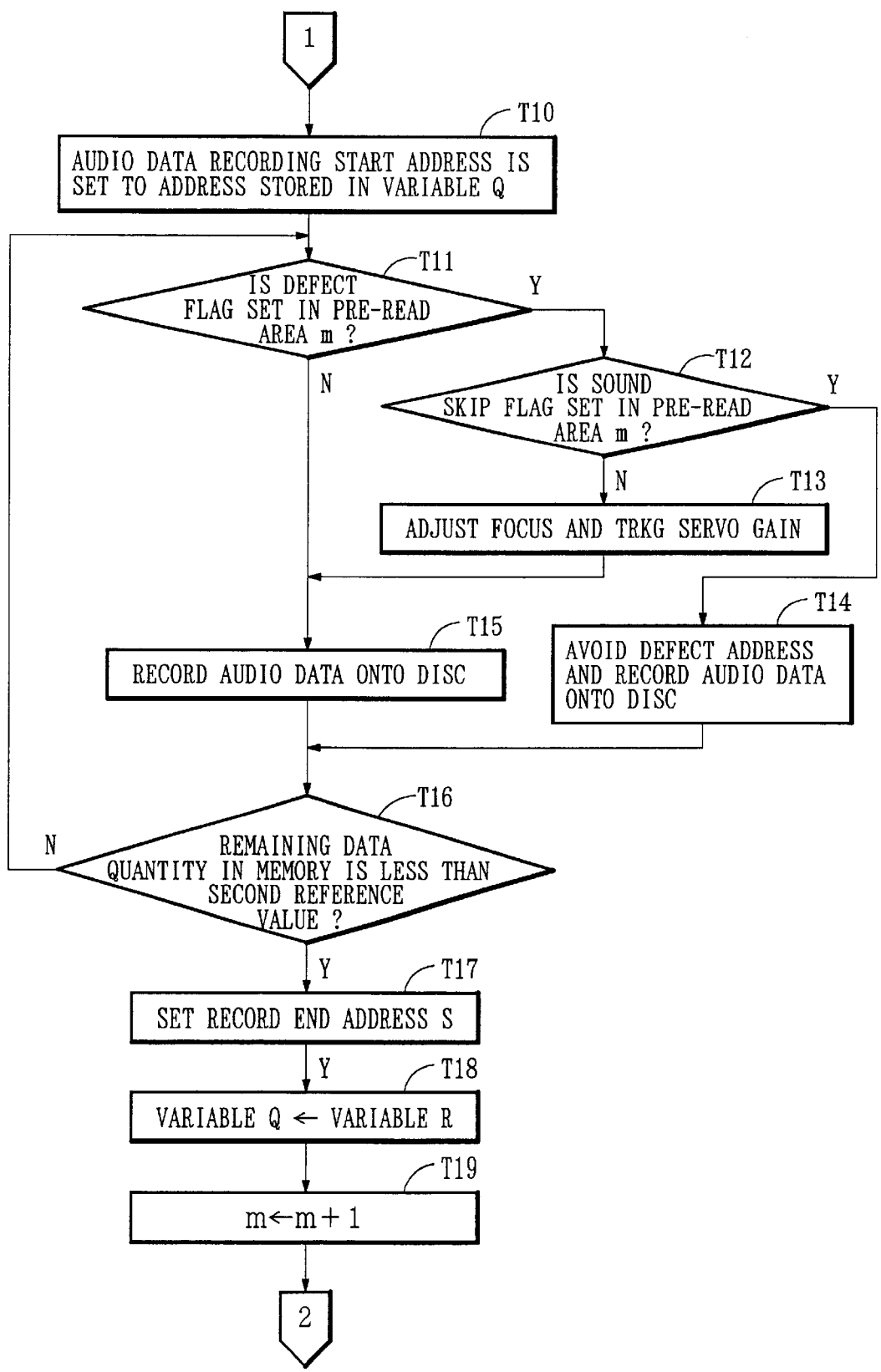

Next, referring to FIGS. 7 to 9, operation of information recording (prefetch scan) of an information record/reproduction unit according to the present invention will be discussed. FIGS. 7 and 8 are flowcharts showing an information recording operation (prefetch scan) of an information record/reproduction unit according to the present invention. FIG. 9 is a graph showing an example of timing of data reading into the memory 23 during recording of the information record/reproduction unit.

The information record/reproduction unit according to the present invention has the disc mounting portion which receives a disc (MD). After the mounting of the disc, a recording operation starts. At first, CPU 32 determines whether the remaining data quantity in the memory 23 is less than a second reference value shown in FIG. 9 (step T1). When it is not less than the second reference value, the execution proceeds to a next step T8. When it is less than the second reference value (timing Td of FIG. 9), the program executes a step T2 disabling recording onto the disc. Then, a step T3 starts pre-read of a pre-read area m (natural number) according to a recording start disc address stored in the variable Q (see period a of FIG. 9).

In addition, step T1 is a confirmation process to start the following program. Normally, the remaining data quantity in the memory 23 is less than the second reference value at the start (except where the same operation has been carried out for the same disc). Step T2 is also a confirmation process, since recording has been interrupted at the start.

Pre-read Process

Step T3 starts pre-read from an address that has been assigned to be read at the program start. When the pre-read has been carried out already (the execution has advanced up to Step T19), the pre-read starts from a next address stored in a variable Q.

During the pre-read in step T3, when a defect is recognized by the method discussed of FIG. 2, the defect range (flaw extent) is determined by a third defect detection means (steps T4 and T5).

The defect range corresponding to a defect length (time length) of FIG. 2(d) is determined whether it is large or not. That is, the decision results in "Y" (YES) in step T5 when the defect is so large that a sound skip (off-tracking) may be generated.

In step T5, when the decision results in "Y" (YES), CPU 32 provides a defect flag and a sound skip flag are set in its memory, which is a third record means, and stores the defect address in the memory (step T7). In step T5, when the decision results in "N" (NO), CPU 32 sets one defect flag in the memory, which corresponds to a second record means, and stores the defect address in the memory (step T6).

Next, in step T8, CPU 32 determines whether the remaining data quantity in the memory 23 is not less than the first reference value shown in FIG. 9. When it is less than the first reference value, the execution return to step T3. In step T8, when the remaining data quantity is not less than the first reference value (timing Te shown in FIG. 9), step T9 terminates reproduction with pre-read and stores a next address subsequent to the latest recorded disc address of a pre-read area m into an address variable R. Meanwhile, in FIG. 9, during the pre-read period a, the remaining data quantity in the memory 23 varies between the first reference value and the second reference value. That is because a disc data reading head requires a predetermined time (search time b) to return from a pre-read end address to a normal data reading start address (prefetch scan start address or the like). In FIG. 9, the search time b is a period within which the remaining data quantity in the memory 23 increases from the first reference value to another reference value predetermined based on the capacity of the memory 23. Normally, the search time is determined to be a little longer than the reading or recording head returning time.

In step T8, the pre-read end timing (pre-read period a) is a period within which the memory remaining quantity in the memory 23 rises from the first reference value to the another reference value predetermined based on the capacity of the memory 23 (depending on the memory remaining quantity). Alternatively, recording onto the MD disc is executed by one cluster length (the recording is interrupted after the recording of the cluster length). The pre-read end timing may be when, for example, two times of the one cluster have been pre-read. As mentioned above, the pre-read end timing may be determined based on various methods in consideration of a search time such as the time b, in any of which the search time is necessary.

Recording Process

Next, a step T10 sets an audio data recording start address at an address area stored in a variable Q (see b of FIG. 9). Then, a step T11 determines whether a defect flag is set in the pre-read area m. When the defect flag is not set, recording audio data onto the disc (see c of FIG. 9) is executed (step T15), and then the program goes to a next step T16.

In step T11, when a defect flag is set in the pre-read area m, the magnitude of the defect such as a surface flaw extent is determined (step T12). Where the defect magnitude is not so large as to produce a sound skip (off-tracking), that is, where a sound skip flag is not set but a defect flag is set, for example, a record characteristic adjustment means adjusts (decrease) a servo loop gain of a focusing (FOCUS) servo and a tracking (TRKG) servo. On the other hand, where a sound skip flag is not set, the focusing (FOCUS) servo or the tracking (TRKG) servo is adjusted (reduced) in servo gain to record (see c of FIG. 9) an audio data onto a the disc (steps T13 and T15). The alteration (reduction) of the focusing servo or the tracking servo in servo loop gain allows to avoid the defect at the defect recognized address. Alternatively, by adjusting a PLL set value, the defect may be avoided. Furthermore, when the disc is read out, a read characteristic adjustment means has a function similar to the defect avoidance described above.

In step T12, where a defect magnitude is so large as to produce a sound skip (off-tracking), that is, where a sound skip flag is set, audio data is recorded onto the disc (see c of FIG. 9) with avoiding an area address having a defect flag and a sound skip flag which are stored in CPU 32 (step T14).

In step T16, it is determined whether the remaining data quantity in the memory 23 is less than the second reference value shown in FIG. 9. Where the data quantity is not less than the second reference value, the execution returns to step T11. Where the data quantity is less than the second reference value (timing Tf of FIG. 9), step S17 sets a record end address S. The end address S is set next to a final address up to which the audio data have been recorded on the disc (step T14 or T15). Step S18 sets an address variable Q to be the same as the address variable S. Step T19 changes the area number from m+1 to m, and the program returns to step T2.

In addition, where the pre-read area is equal to an audio data recording disc area in step T14 or step T15, that is, where the address variable R is equal to the address variable S, step S18 may set the address variable Q to be the same as the address variable R.

FIG. 10 shows an example of a data arrangement of a U-TOC area in a MD. As illustrated in FIG. 10, the U-TOC area of the MD is constituted by a data area of, for example, 4 bytes×587. On a top position, there is a header for recognizing the U-TOC area. The header has a synchronizing pattern consisting of one byte data in which all are 0 (zero) or 1 (one) identically. At a predetermined address position, data including a first recorded music number (First TNO) 4, a last music number (Last TNO) 5, a sector storage condition 6, a disc serial number 7, and a disc ID 8 is recorded. Furthermore, there is provided a table indicating data 2 corresponding to a later-discussed control table 3 associated with all the recorded music numbers for storing various kinds of table pointers (P-DFA to P-TNO255).

Meanwhile, the managing table 3 includes 255 rows of part tables (01) to (FF). Each part table can record a start address showing a start point of a segment (physically continuing track), an end address showing the segment end, segment mode information, and a link information including segment start and end addresses of another segment which will be connected to the former segment.

That is, the U-TOC area, which is different from a normal music area, records information associated with the whole disc volume. An erroneous record in the music area has a bad effect only on the area including the erroneous record. However, an erroneous record in the U-TOC area may cause that the whole disc volume becomes unavailable at the worst. Thus, the U-TOC area is desired to have a maximum reliability/discretion in information writing.

Meanwhile, each part of the U-TOC area may be used comparatively freely. Thus, it may be possible that the U-TOC area records a defect flag and a defect detected address to avoid usage of an abnormal track as discussed of the present invention. More specifically, for example, if a defect is detected in areas having addresses n to n+8, address n+1 and address n+7 are connected with a link (FIG. 10), so that these defect areas can be avoided on recording.

In dubbing record, for example, from a MD (reproduction system) to another MD (record system), a defect detected address in the reproduction system may be transferred to the record system, so that the defect sector supplied into the record system is altered in a record characteristic (and vice verse). Moreover, the defect defected address is recorded in the CPU memory to enable dubbing record more advantageously from the reproduction system to the recording system.

What is claimed is:

1. An information reproduction method for reading data recorded on a storage medium by means of a pickup, writing the data in a memory, and sequentially reading out the data written in the memory, said information reproduction method comprising:

reading a data recorded on the storage medium from a predetermined top address of the storage medium by a read means, before next data is read out from the storage medium, storing the read data in the memory, detecting a defect of the storage medium based on the data stored in the memory, storing the address of the defect position on the storage medium, returning the read means to the predetermined top address on the storage medium, and reducing at least one of servo loop gains of a focusing servo and a tracking servo to read the data from the predetermined top address on the storage medium by the read means when a defect is detected on the storage medium.

2. An information reproduction method for intermittently reading data recorded on a storage medium by means of a pickup, writing the data in a memory, and sequentially reading out the data written in the memory, said information reproduction method comprising:

reading a data recorded on the storage medium from a predetermined top address of the storage medium by a read means during a pause period of the data reading for the reproduction, before a next data is read out from the storage medium, storing the read data in the memory, detecting a defect of the storage medium based on the data stored in the memory, storing the address of the defect position on the storage medium, returning said read means to the predetermined top address on the storage medium during a pause period of the data readout, and reducing at least one of servo loop gains of a focusing servo and a tracking servo to read the data from the predetermined top address on the storage medium by the read means when a defect is detected on the storage medium.

3. An information record method for writing data, which will be recorded on a storage medium in a memory firstly, and for recording the data, which is written in the memory, on said storage medium, said information record method comprising:

reproducing of the storage medium from a predetermined top address of the storage medium by a predetermined read means before recording data on the storage medium, storing the reproduced information in the memory, detecting a defect of the storage medium based on the information stored in the memory, storing the address of the defect position on the storage medium, returning said read means to the predetermined top address on the storage medium, and adjusting a data record characteristic on recording data of the address of the defect position on the storage medium when a defect is detected on the storage medium.

4. An information record method for sequentially writing data in a memory firstly and for intermittently recording the data, which is written in the memory, on said storage medium, by repeating a recording period and a pausing period by turns of a data record means, the information record method comprising:

reproducing of the storage medium from a predetermined top address of the storage medium by a read means during the pausing period of the data record means, before recording data on the storage medium, storing the reproduced information in the memory, detecting a defect of the storage medium based on the information stored in the memory, storing the address of the defect position on the storage medium, returning said record means to the predetermined top address on the storage medium during the pausing period of the data record means, and adjusting a data record characteristic on recording data of the address of the defect position on the storage medium when a defect is detected on the storage medium.

5. An information reproduction method for reading data recorded on a storage medium by means of a pickup, writing the data in a memory, and sequentially reading out the data written in he memory, said information reproduction method comprising:

reading a data recorded on the storage medium from a predetermined top address of the storage medium by a read means, before next data is read out form the storage medium, storing the read data in the memory, detecting a defect of the storage medium based on the data stored in the memory, storing the address of the defect position on the storage medium returning the read means to the predetermined top address on the storage medium, and altering a servo loop gain to read the data at the address of the defect position on the storage medium by the read means when a defect is detected on the storage medium.

* * * * *